United States Patent [19]

Thomson

[11] Patent Number: 4,550,559
[45] Date of Patent: Nov. 5, 1985

[54] CABLES AND PROCESS FOR FORMING CABLES

[75] Inventor: Ian M. Thomson, Wokingham, England

[73] Assignee: Cable Belt Limited, Edinburgh, Scotland

[21] Appl. No.: 528,439

[22] Filed: Sep. 1, 1983

[30] Foreign Application Priority Data

Sep. 1, 1982 [GB] United Kingdom ................ 8224956
Jun. 2, 1983 [GB] United Kingdom ................ 8315181

[51] Int. Cl.⁴ .................... D07B 1/08; D07B 1/10; D07B 1/16; D07B 7/14
[52] U.S. Cl. .................................. 57/223; 57/215; 57/217; 57/219; 57/221; 57/7; 57/9
[58] Field of Search ............... 57/215, 217, 219, 221, 57/223, 232, 234, 237, 248, 7, 9

[56] References Cited

U.S. PATENT DOCUMENTS

| | | | |
|---|---|---|---|
| 1,393,750 | 10/1921 | Carter | 57/215 X |
| 2,509,894 | 5/1950 | Toulmin et al. | 57/220 |
| 2,587,521 | 2/1952 | Peterson | 57/906 X |
| 3,307,343 | 3/1967 | Gilmore et al. | 57/215 |
| 3,526,086 | 9/1970 | Morgan | 57/223 X |
| 3,911,785 | 10/1975 | Hood | 57/234 X |
| 4,059,951 | 11/1977 | Roe | 57/215 X |

*Primary Examiner*—Donald Watkins
*Attorney, Agent, or Firm*—Leydig, Voit & Mayer, Ltd.

[57] ABSTRACT

A cable comprises at least one layer of strands (10) with each strand covered with an individual sheath (20) of rubber or plastics material. The sheaths are so shaped (16, 17, 18) that the sheaths of adjacent strands interlock. This provides a layer in which the strands have a generally fixed spatial relationship both to each other and within the cable. This reduces inter-strand forces, so increasing cable life, and also provides a dimensionally stable cable.

25 Claims, 7 Drawing Figures

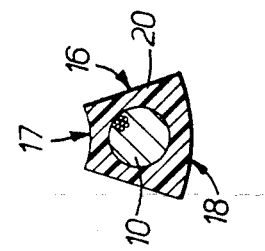
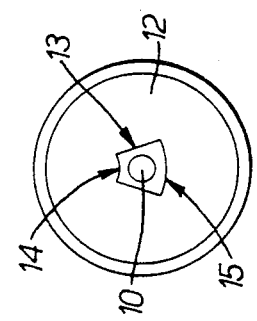
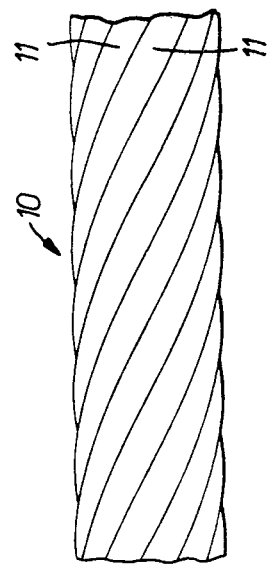
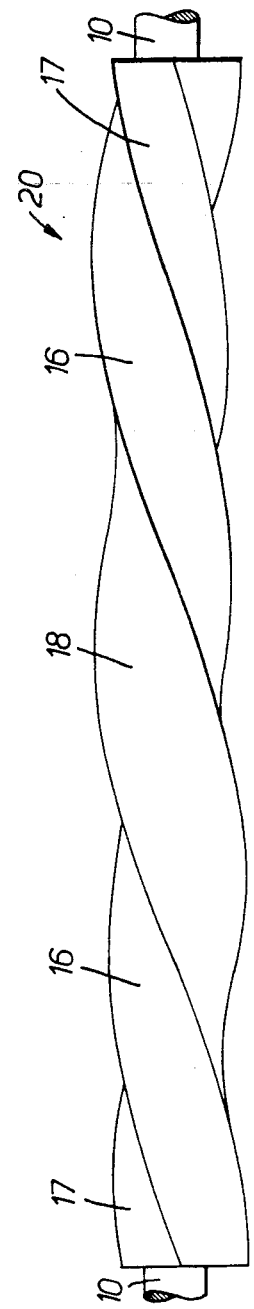

CABLES AND PROCESS FOR FORMING CABLES

BACKGROUND TO THE INVENTION

1. Field of the Invention

The invention relates to cables and particularly to cables in which the strands are covered with individual sheaths of a plastics or rubber material.

2. Review of the Prior Art

In previously proposed cables, the strands or the individual strand cores, where these are provided are generally circular in cross-section. Such a cable construction has a number of disadvantages. The geometry of the cable is not particularly stable because of the ability of individual strands to deform and rotate relatively to one another. Since the degree to which this will occur is not predictable, the performance of such a cable cannot be precisely predicted. In addition, interstrand contact takes place over a very small area and thus inter-strand pressures are high, which, in combination with the ability of the strands to move relatively one another, leads to strand wear. This wear is increased if the cable passes round a pulley since such flexing of the cable produces relative strand movements. In addition, the area of contact between the strand cover and the pulley is limited, swing rise to high stresses. Indeed, the inter-strand forces of such a rope will allow only limited flexing of such a cable. A cable of this kind also allows only limited transfer of loads between the strands.

SUMMARY OF THE INVENTION

According to a first aspect of the invention, there is provided a cable formed by one or more layers of strands twisted together, each strand of the or at least one layer being covered with an individual sheath of a plastics or rubber material, and the sheaths being so shaped that the sheaths of adjacent strands interlock to provide a layer in which the strands have a generally fixed spatial relationship both to each other and within the cable.

According to a second aspect of the invention, there is provided a method of manufacturing a cable formed by one or more layers of strands twisted together and comprising covering a plurality of strands with individal sheaths of a plastics or rubber material, each sheath being so shaped as to be inter-engageable with the sheaths of other strands of the same layer and then twisting the strands together to form the cable or a layer of the cable, with adjacent strands in a layer being so arranged that their sheaths interlock to provide a layer in which the strands have a generally fixed spatial interrelationship both to each other and within the cable.

BRIEF DESCRIPTION OF THE DRAWINGS

The following is a more detailed description of some embodiments of the invention, by way of example, reference being made to the accompanying drawings in which:

FIG. 1 shows a portion of a strand for incorporation into a first cable,

FIG. 2 is a schematic elevation of a die of an extruder for extruding a sheath onto the strand of FIG. 1, FIG. 3 is a cross-section of a strand covered by a sheath, FIG. 4 is a side elevation of a sheathed strand.

DESCRIPTION OF THE PREFERRED EMBODIMENTS

Figure 5:
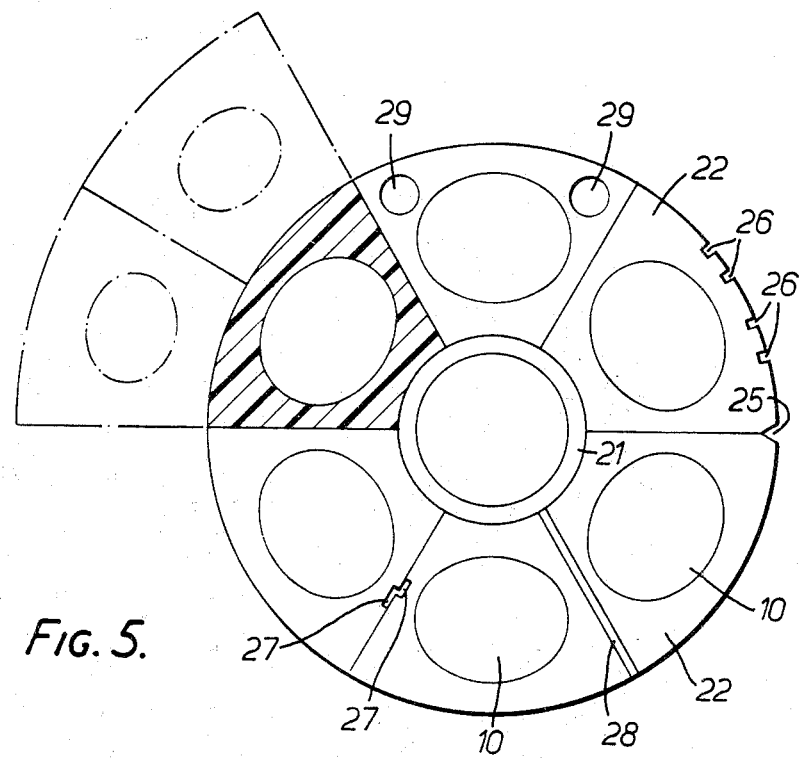
FIG. 5 is a section of the first cable incorporating sheathed strands.

Referring first to FIG. 1, in the first cable, a strand 10 is of circular cross-section (see FIGS. 1, 2, 3 and 4) and is formed from a plurality of elements 11 twisted together. The elements may be metal wires or bunches of synthetic material or a combination of such wires or bunches. Suitable metal wires are steel wires, particularly high tensile steel wires. The bunches of synthetic material are preferably formed from yarns spun from filaments of, for example, a plastics material such as an aromatic polyamide (e.g.KELVAR (Trade Mark)). Alternatively, the strands may be made from different materials or different combinations of materials and/or different amounts of twist, to promote sharing of the load.

All the elements 11, or alternate elements 11 may be covered with a sheath of a plastics or rubber material before being formed into the strand. This reduces interfilament friction and also increases the load transference between filaments.

The strand 10 need not be formed from wires and/or bunches twisted together. Alternatively, the strand 10 may be formed by several bunches of yarn or strands of synthetic material arranged parallel to one another (not shown). The strand 10 so formed may have a cover shrunk or extruded over the bunches or strands to hold them together.

After the strand 10 has been formed, it is passed through an extruding die 12 (FIG. 2). A suitable molten plastics or rubber material is supplied to the die under pressure from a heated screw feed, in conventional fashion. Suitable materials may include, either separately or in compounds, thermoplastic materials such as polyesters, polyethers, polypropylene, polyetheretherketone, nylon and polyvinylchloride; thermosetting and vulcanate materials such as polychloraprene, natrural and synethic rubbers, polyurathane, HYPALON (trade name) and EPDM; and chemical setting materials.

The die 12 has a generally trapezoidal shape with straight but converging sides 13 interconnected at their closer spaced ends by a shorter convex end 14 and interconnected at their further spaced ends by a concave arcuate end 15. The dimensions of the die are such that it has a greater area than the cross-sectional area of the strand 10 and the strand 10 is so guided through the die that there is a gap between the outer surface of the strand and the surfaces defining the die (as shown in FIG. 2). The convergance of the sides 13 and the curvature of the arcuate ends 14,15 are chosen in accordance with considerations described below.

The strand is fed through the die at a predetermined linear rate of feed. The die 12 is simultaneously rotated at a predetermined rotational speed, with the direction of rotation being the same as the hand of the strand, or being suited to the lay of the cable.

As a result of this, a sheath 20 is extruded around the strand which has a shape corresponding to the shape of the die and which extends spirally along the strand. This is shown more clearly in FIGS. 3 and 4 where it will be seen that the sheath 20 has converging sides 16, a concave narrower end surface 17 and a convex wider end surface 18. The convergance of the sides 16 is chosen as described below.

The extruded sheath 20 penetrates the interstices of elements 11 and the sub-strands to lock the sheath to the strand. This interlock may, however, be increased by providing spaces between the elements to allow deeper penetration of the sheath into the strand. Alternatively or additionally, a chemical bonding material may be placed on the strand before extrusion to form a bond between the strand and the sheath.

In addition, a lubricant may be inserted into the strand before the sheath 20 is applied, so that the lubricant is retained within the strand by the sheath 20 after this has been extruded.

As best seen in FIG. 4, the rotation of the die 12 causes the sheath to extend spirally round the strand. Because the rate of linear feed of the strand and the rotational speed of the die are controlled, the pitch of this spiral can be arranged to be a required pitch. The way in which the required pitch is determined is described in more detail below.

The sheathed strands are then laid-up to form a cable. In FIG. 5 a 1+6 cable is shown (i.e. a cable having a sheathed core strand 21 surrounded by six equiangularly spaced strands 22). Any suitable cable configuration can, however, be used although preferably the strands are of a size, number and geometry to permit the introduction of tucks, thus allowing the cable to be long spliced. For example, two or more layers of strands may be provided, as indicated in broken line in FIG. 5.

In each strand 22, the angle of convergance of the side surfaces 16 and the curvature and formation of the arcuate surfaces 17 and 18 are chosen in accordance with the diameter of the cable and the diameter of the core. It will be appreciated, however, that no core strand 21 need be included, in which case the side surfaces 16 of the sheath 20 may converge to a point. In addition, or alternatively, a plurality of layers of strands may be provided with the convergance angles of the side surfaces 16 and the arc of the wider and narrower surfaces 17, 18 being chosen accordingly.

The strands 22 are laid-up by feeding the required plurality of strands through a conventional cable closing machine. The pitch of the spiral of the sheath, as extruded, is chosen to be the same as the pitch of the strands 22 when they are laid up into the cable.

It will be appreciated that by using a slightly different pitch for the spiral of the strand sheath from that determined by the cable lay, as well as by the use of back twist or forward twist during the closing process, forces can be applied to the strands 10 which will also tend to lock the rope construction together. When such variations in twist are used, it may be desirable to heat-set the sheaths after being laid-up in order to fix the twist in the sheaths.

It will be seen that in the laid up cable, the side surfaces 16 of adjacent sheaths are in face-to-face engagement. In addition, the wider surfaces of the strands form a continuous cylindrical outer surface to the cable. This construction has a number of benefits, amongst which are:

1. The cable has a stable geometry since the spatial inter-relationship between all the strands is fixed by the sheaths so that no strand can move substantially relatively to any other and cannot change its position within the cable. Thus the performance characteristics of the cable will be stable and predictable.

2. That the inter-strand forces are spread over a comparatively large surface area so reducing the pressure between the strands and thus increasing the strand life and hence the cable life.

3. As a consequence of this, it is possible for the strands to move easily relatively to one another thus allowing the cable to flex readily around the pulley so reducing the increase in inter-strand forces caused by such flexing.

4. The cylindrical outer surface provides a large area for frictional grip between the cable and, for example, a drive pulley, thereby reducing the stress induced in the sheath by the transmission of torque from the drive pulley to the cable.

5. The cylindrical outer surface presents a large bearing area to a support pulley and results in reduced bearing pressure between such a pulley and the cable, or permits the use of greater pulley loads for the same bearing pressure. This advantage makes it possible to use such a cable with a V-section pulley, which cannot be used with previous cables because of the high bearing pressures between such a pulley and the individual strands which pinch such a cable and cause the strands to be forced out of their geometric configuration, i.e. the cable will tend to flatten. 6. Because of the substantially solid cross-section of the cable, it is difficult for dirt and other damaging material to enter the interior of the cable.

7. As compared with cables in which no single strand is sheathed, but in which the whole exterior of the cable is covered by a sheath, the cable described above with reference to the drawings is easier to splice.

8. In addition, in comparison with such cables, damage to any one sheath does not cause corrosion of all the strands.

9. The inter-engagement of all the strands (including the core strand) allows increased transfer of loads between the strands so that the load is carried evenly between the strands.

It will be appreciated that there may be many alterations or modifications to the arrangement described above amongst which are the following.

Figure 6:
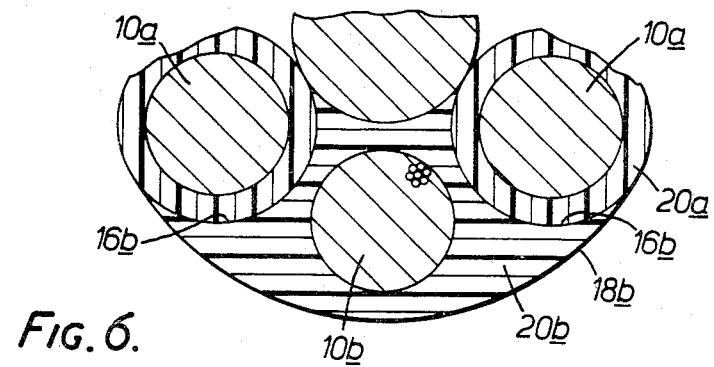
FIG. 6 is a section of a second form of cable incorporating sheathed strands.

The sheaths of the strands 10 need not all have the same cross-section. Referring to FIG. 6, in one embodiment, alternate strands 10a are provided with sheaths 20a which are circular in cross-section. The intermediate strands 10b are provided with sheaths 20b which have concave side surfaces 16b in which the circular sheaths 20a of the adjacent strands 10a are received. In this way, the strands 10a, 10b of the layer are interlocked in the same way as the strands 10 in the embodiment of FIGS. 1 to 5. The outer surfaces 18b of the intermediate strands 10b are of extended arcuate length to cover the adjacent strands 10a and provide the cable with a cylindrical outer surface.

The construction of the strands 10a, 10b and the formation of the sheaths 20a, 20b are as described above with reference to FIGS. 1 to 5.

The outer surfaces 18 of the sheaths may be provided with formations to prevent a build-up of water between the cable and a surface, such as a pulley, over which the cable passes. For example, the sheath may be formed with chamfers 25 (FIG. 5) at the edges between the outer surfaces 18 and the side surfaces 16. These will wipe over a pulley surface and so remove both water and any dirt deposit.

Additionally or alternatively, grooves or channels 26 (FIG. 5) may be extruded or cut into the surfaces 18 for this purpose. Another possibility is to have a tread pattern on this surface.

Inter-strand friction may be further reduced by providing the side surfaces 16 with grooves 21 (FIG. 5) within which oil is received to provide a lubricant between the contacting surfaces 16. Adjacent surfaces may be provided with grooves 27 which are offset from one another with an overlap between them which provides a restricted outlet for lubricant within the grooves. Additionally or alternatively, pieces of low-friction material 28 (FIG. 5) such as polytetrafluoroethylene may be provided between the adjacent surfaces 16.

The core strand may be provided with a sheath having formations which inter-engage with formations provided on the inner surfaces 17 of the sheaths. This will allow positively interlocking between the core strand and the remaining strands.

Adjacent strands or layers of strands may be of opposite hands to reduce rotation.

The sheaths may be provided with closed air cells 29 (FIG. 5) in order to produce a cable which is capable of floating wholly or partially in water.

Figure 7:
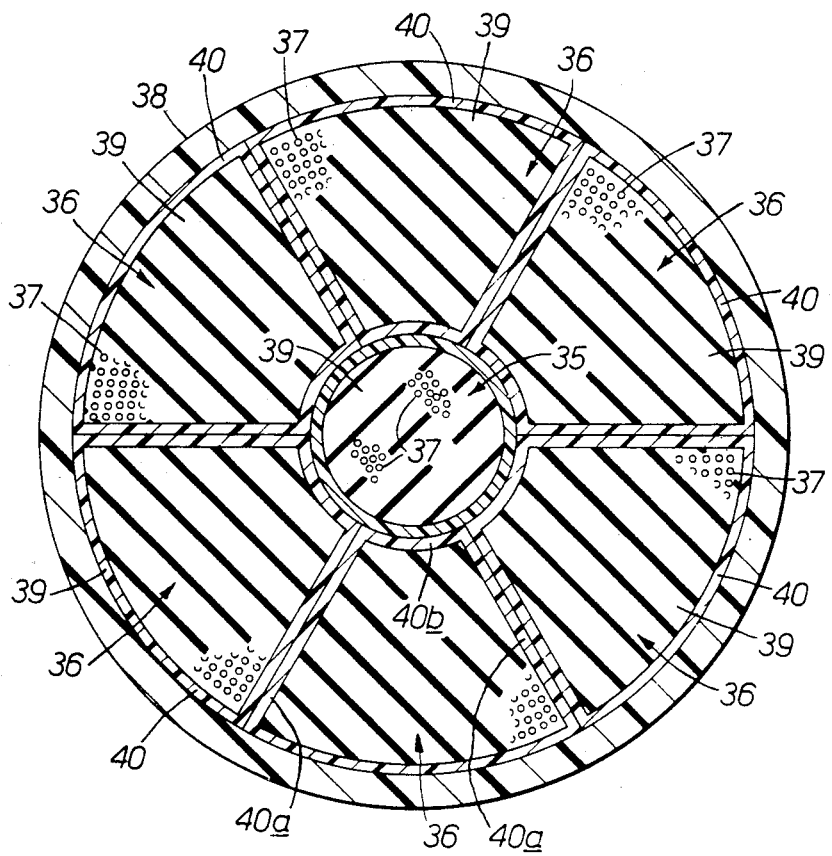
FIG. 7 is a section of a third cable incorporating sheathed strands.

Referring next to FIG. 7, the third cable comprises seven strands, arranged as a central strand 35 and six outer strands 36, all the strands being helically twisted together. It is not essential that there be seven strands but this is advantageous for ease of splicing. The seven strands are covered by a hardened outer sheath 38 of rubber or the like.

In one form of the cable, each strand 35, 36 is made up of a plurality of filaments of an aromatic polyamide such as "KEVLAR" (Trade Mark) as sold by Du Pont de Nemours International S.A. More specifically, each strand may comprise a plurality (say 200) cords 37 (only some illustrated) each of which in turn consists of one or several (3, 5 or 7, for example) yarns. Each yarn may consist of a large number of "KEVLAR" (Trade Mark) filaments, say 1500 filaments. The manner of manufacture is to be described in more detail below, but it should be noted that each cord 37 in a strand 35, 36 is individually surrounded by rubber or similar material 39.

In addition, each strand 35, 36 is itself surrounded by a covering 40 of any of the kinds desribed above with reference to FIGS. 1 to 4. The coverings 40 of the six outer strands 36 are shaped with straight sides 40a interconnected by inner and outer curved surfaces 40b, 40c. The side surfaces 40a of adjacent sheaths 36 are in face-to-face contact. In addition, the outer curved surfaces 40c form a continuous cylindrical outer surface and the inner curved surfaces 40b co-operate with the sheath 40 of the core strand 35. This has the advantages set out above in relation to the cable of FIGS. 1 to 5.

Advantageously, the strength of the bond between the outer sheath 38 and the individual strand coverings 40 is less strong than the tensile strength of the rubber or similar material of the strand coverings 40 so as to facilitate the peeling away of the outer sheath 38 from the strands. In addition, the bond between the strands is less than the tensile strength of the rubber or similar material 39 of the strands. The fact that these two requirements are satisfied facilitates splicing, because it enables the outer sheath 38 to be easily peeled off the strands and the strands to be easily separated.

It is desirable that the cable be arranged to provide an advance indication of weakening or incipient failure such as caused by breakage of cords or strands. This may be arranged in various ways, some of which are described below by way of example and which may be used individually or in any suitable combination.

The outer sheath 38 may be given a colour which contrasts with the colour of the coverings 40 of the strands 35, 36. In this way, tearing or cutting or other damage to the outer sheath 38, rendering externally visible the contrasting colour of the sheath covering 40, will be promptly indicated.

Weakening of the cable may result in local decrease of its diameter and consequent increase in cable length.

A length decrease in cable diameter can be detected by providing a series of cuts through the outer sheath 38, the cuts being arranged at intervals along the cable and each extending for a short length along the length of the cable. The cuts are arranged so as to reveal the contrasting colour of the strand covering 40. Therefore, should there be a local decrease in cable diameter, this will tend to close up the cuts and will be visually indicated by the disappearance of the contrasting colour of the covering 40.

Increase in cable length can be indicated by a further series of short-length cuts, these cuts being distributed along the cable and each extending for a very short distance around its circumference. These cuts are arranged to be normally invisible, but open up in the event of an increase in cable length and reveal the contrasting colour of the strand coverings 40.

A method by which the cable illustrated in FIG. 7 may be manufactured will now be briefly described.

Initially, the aromatic polyamide material constituting the basis of the rope may be in the form of yarns each of which comprises a large number, 1500 say, of filaments.

An early stage in the process, therefore, consists in a twisting operation by which the yarns are converted into cords. Each cord 37 may consist of only one yarn or it may consist of more than one yarn, for example three, five or seven yarns. Even when each cord 37 consists of only one yarn, the twisting operation is still carried out. The twisting operation may be preceded by an operation in which the yarn or yarns is or are dipped in a bonding agent.

The strands 35, 36 are then produced from the cords 37. Each strand 35, 36 consists of a relatively large number of cords 37, say 60 to 200. Within each strand 35, 36, the cords 37 are all parallel to each other and are embedded in rubber or similar material which individually surrounds the cords 37. The process of converting the cords 37 into strands 35, 36 may involve the use of a cross-head extruder of the kind described above with reference to FIG. 2, in which the cords 37 are fed, in parallel form, through a die and in which, simultaneously, the rubber or similar material is fed in at right angles and individually surrounds the cords 37 and holds them all together. The cords are not twisted together. This process also forms the outer strand covering 40. The strand issuing from the extruder then passes into a continuous heating chamber which cures the rubber.

Seven of the strands so formed are then placed together in the manner shown in the Figure and are laid-up together to form the cable. Using extrusion techniques, the outer sheath 38 is then added.

Finally, the cable is then subjected to heat and pressure to bond the whole together. A hydraulic press may be used for this purpose, its being large enough to accommodate several runs of the rope at a time.

In a modification, the cords are twisted together within each strand, or are arranged in bundles twisted together within each strand.

Another way of embedding the cords in rubber is by using a dipping process, where the cord is passed through a bath of liquid elastomer which is then dried to form a solid elastomer adhering to the cord.

Such a cable as has been described with reference to FIG. 7 has a variety of applications. Where it runs around or partially around a pulley or similar member and there is to be a transfer of force between the member and the cable via the friction between them, it may be desirable to provide grooving in the cable's outer sheath 38 to increase this friction.

The use of the "KEVLAR" (Trade Mark) material as the main constituent of the cable is advantageous in that "KEVLAR" (Trade Mark) has a volume/strength ratio similar to that of steel and a much lower weight/volume ratio. However, other forms of cable embodying the invention may be produced in which the main constituents of the rope are not aromatic polyamide or "KEVLAR" (Trade Mark) filaments but are filaments of some other material. For example, steel wires could be used. In such case, the steel wires would be similarly arranged to the cords 37 as described above.

In any of the embodiments described above with reference to the drawings, the pressure acting inwardly on the central strand depends in part on the tension in the cable. Therefore, by use of suitable means for measuring the pressure acting on the central strand, it is possible to provide an indication of the rope tension and therefore a warning of excess tension. Such pressure may be monitored electrically, for example. Synthetic materials are available whose conductivity changes sharply in response to pressure, and such materials could therefore be incorporated in the central strand for monitoring its pressure.

An electrically conductive wire or wires could be incorporated in the cable so as to extend along its length, the wire or wires being arranged to break in the event of excessive elongation of the rope, thus enabling electrical monitoring of the rope elongation.

In all the embodiments of the invention described above with reference to the drawings, the sheaths are applied to the associated strands in a spiral to take account of the twisting of the strands into a cable. It will be appreciated, however, that such a spiral sheath need not be used. The sheath could be applied to the strands in a straight configuration (i.e. without any twist) and the sheaths twisted as the cable is laid up. In this case, the sheaths may be heat-set after laying up, in order to fix the twist.

I claim:

1. A cable comprising:
    at least one layer of strands twisted together,
    each strand of said at least one layer being of circular cross-section and being formed of a plurality of elements twisted together,
    each strand of said at least one layer being covered with an individual sheath of a plastics or rubber material,
    at least some of said individual sheaths being of non-circular cross-section prior to the twisting of said at least one layer such that the sheaths of adjacent strands interlock to provide a layer in which the sheaths provide the circular strands with a generally fixed spatial relationship both to each other and within the cable.

2. A cable according to claim 1, wherein the sheaths of said layer all have the same non-circular cross-section.

3. A cable according to claim 2, wherein each sheath provides two spaced side surfaces which are generally straight in planes normal to the cable axis and which engage corresponding surfaces of the sheaths of the adjacent strands.

4. A cable according to claim 1, wherein the sheaths of adjacent strands in said layer are of differing cross-sections.

5. A cable according to claim 4, wherein alternate strands are formed with a sheath of circular cross-section while each strand intermediate said alternate strands is formed with a sheath having two concave side surfaces which receive said circular cross-section sheaths of the adjacent strands.

6. A cable according to claim 1, wherein the engaging surfaces of the adjacent strands include at least one groove for containing a lubricant to decrease inter-sheath friction.

7. A cable according to claim 1, wherein inserts are provided between the side surfaces of adjacent strands for reducing inter-sheath friction.

8. A cable according to claim 1, and in which the strands which form the outer layer of the cable are sheathed and wherein the outer surfaces of said sheaths are provided with formations for co-operation with a surface over which the cable passes, to remove water from between the cable and the surface.

9. A cable according to claim 1 and in which there are two or more layers of strands, the strands of each layer being provided with interlocking sheaths.

10. A cable according to claim 9, wherein the radially inner parts of the sheaths of each layer, except the radially innermost, are provided with formations for interlocking engagement with corresponding formations on the radially outer surface of the adjacent layer.

11. A cable according to claim 1 and including a core strand which is covered with an individual sheath of a plastics or rubber material.

12. A cable according to claim 1 and including a core strand, the sheaths of the layer of strands adjacent the core strand having radially inner arcuate surfaces shaped to co-operate with the core strands or with the sheath of the core strand.

13. A cable according to claim 12, wherein the sheaths of the layer of strands adjacent the core strand have radially inner surfaces provided with formations for engagement with corresponding formations on the sheath of the core strand to interlock the innermost layer of strands to the core strands.

14. A cable according to claim 1, wherein each strand is formed from a plurality of elements twisted together.

15. A cable according to claim 14, wherein the material of each sheath penetrates between the elements of the associated strand to interlock the sheath and the strand.

16. A cable according to claim 14 or claim 15, wherein each sheath is bonded to the elements of the associated strand by a bonding agent.

17. A cable according to claim 14, wherein at least each alternate element is provided with a sheath of a rubber or a plastics material.

18. A cable according to claim 14, wherein the elements are bunches of yarns formed from filaments of a plastics material such as an aromatic polyamide.

19. A cable according to claim 1, wherein at least some of the sheaths include closed air cells so that the cable can float in water.

20. A method of manufacturing a cable comprising:
twisting a plurality of elements together to form strands of circular cross-section,
covering a plurality of of said strands with individual sheaths of a plastics or rubber material of non-circular cross-section,
each sheath being so shaped as to be inter-engageable with the sheaths of other strands of the same layer and then,
twisting the strands together to form the cable or a layer of the cable, adjacent strands in a layer being arranged with their sheaths interlocked to provide a layer in which the sheaths provide the circular strands with a generally fixed spatial inter-relationship both to each other and within the cable.

21. A method according to claim 20, and further comprising extruding the sheath round each strand.

22. A method according to claim 20, wherein the sheath of each strand or the sheaths of at least some of the strands, before the twisting of the strands into a cable, extend in a spiral along the associated strand with the same hand as that of the strand in the cable.

23. A method according to claim 20, and in which the sheath is extruded around each strand, the method comprising forming the spiral sheath by rotating the extruding die around the travelling strand.

24. A cable comprising:
a layer of strands twisted together, each strand of said layer being formed of a plurality of longitudinally extending elements,
means for fixing the strands in spatial relationship both to each other and within the cable including an individual sheath of a plastics or rubber material covering each strand, certain of said sheaths having a non-circular cross section as formed extending spirally along the strand before twisting of the strands into the cable, side surfaces of sheaths of adjacent strands in the cable being in face to face inter-engagement to interlock the strands, and the outer surfaces of adjacent sheaths forming a substantially continuous outer cable surface.

25. A method of manufacturing a cable comprising the steps of:
(a) taking a plurality of load-bearing elements,
(b) forming from said elements, a plurality of strands,
(c) covering at least some of said strands with an individual sheath which is of plastics or rubber material, and which is non-circular in cross-section,
(d) during said covering step, extending each non-circular individual sheath in a spiral along the associated strand,
(e) twisting said spirally sheathed strands into a cable with the hand of twist of said strands being the same as the hand of the spiral sheaths, the non-circular cross-section of the sheaths interlocking the sheaths in the cable so that the sheaths provide the strands with a generally fixed spatial relationship both to each other and within the cable.

* * * * *